Sept. 13, 1955 G. O. BARTOO 2,717,556
WINDSHIELD WASHER
Filed Oct. 16, 1952
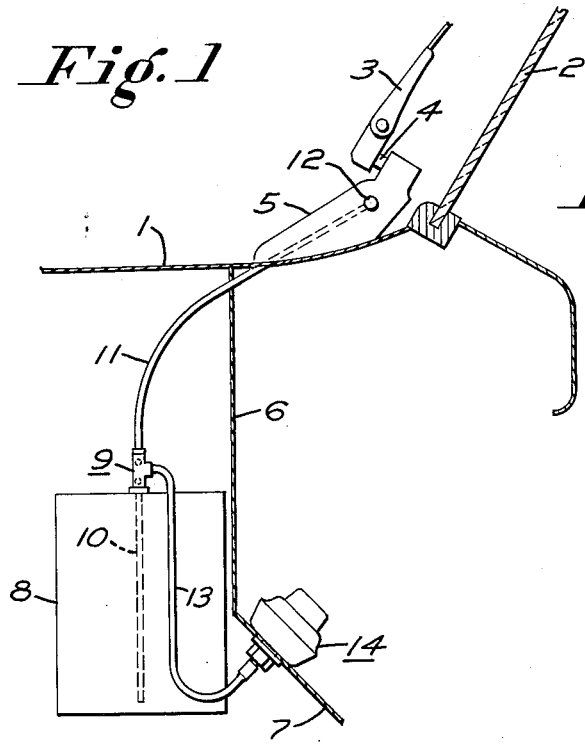
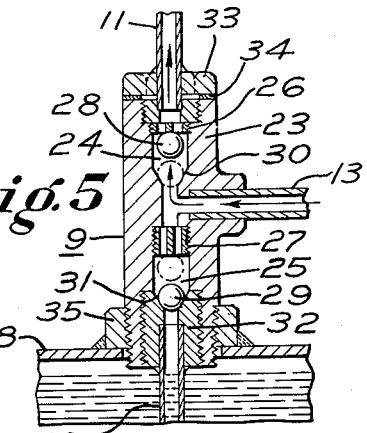
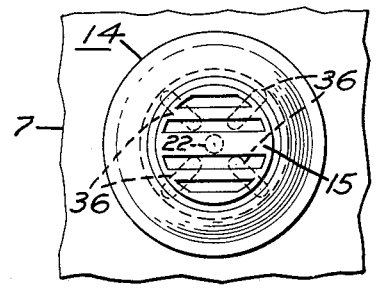
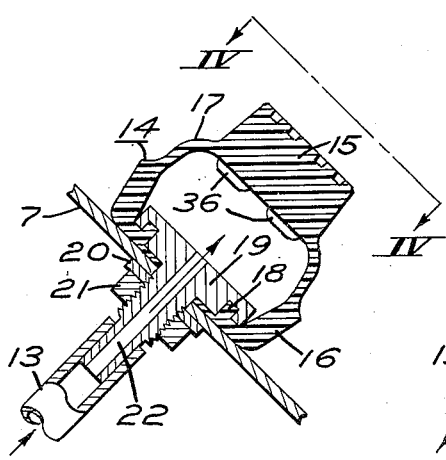
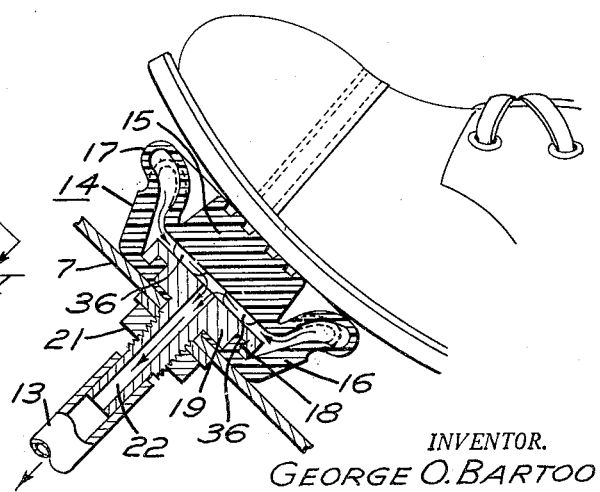
INVENTOR.
GEORGE O. BARTOO
BY
Bean, Brooks, Buckley & Bean.
ATTORNEYS.

United States Patent Office 2,717,556
Patented Sept. 13, 1955

2,717,556
WINDSHIELD WASHER

George O. Bartoo, Buffalo, N. Y., assignor to Trico Products Corporation, Buffalo, N. Y.

Application October 16, 1952, Serial No. 315,175

5 Claims. (Cl. 103—148)

This invention relates generally to the windshield clearing art, and more particularly to a windshield washer system and a power element therefor for delivering fluid on to the windshield in the path of a wiper to clear the glass of matter deposited on the surface thereof.

The importance of providing a system for effectively clearing a vehicle windshield of vision obscuring matter thereon cannot be overemphasized, particularly in view of the ever increasing number of vehicles on the highways and the ever increasing speed of travel of these vehicles. Prior art efforts along this line have commonly taken the form of manually operable pumps for the handling of fluid which require continued manual action and thus divert the vehicle operator's attention from his driving, or pumps utilizing springs for the building up of potential energy which arrangements are relatively complicated and expensive. Another disadvantage of some prior art devices is that they provide too short a duration of fluid delivery to be effective.

Accordingly, a primary object of this invention is to provide a simple but efficient washer mechanism for effectively supplying fluid in the manner aforesaid.

A further object of this invention is to provide a windshield washer system operable with a minimum of attention from the vehicle operator and without requiring that the operator shift his eyes from the road ahead even momentarily.

In addition, it is an object of this invention to provide a windshield washing system wherein upon actuation the system continues to jet fluid against the glass for a predetermined duration of time at a substantially constant pressure.

It is also an object of this invention to provide a windshield washer system wherein delivery of fluid to the glass beyond the normal duration thereof can be continued at the will of the operator without substantial interruption.

The foregoing and other objects will become immediately apparent upon reading the ensuing detailed description, taken together with the accompanying drawing forming a part thereof and wherein:

Fig. 1 is a view, partly in section, showing the windshield washer system of the instant invention installed in place on a vehicle;

Fig. 2 is a fragmentary detail view in section of the windshield washer power element of the instant invention, showing the same in its normal position.

Fig. 3 is a view similar to Fig. 2 but showing the power element in operative position for the delivery of fluid to the windshield glass;

Fig. 4 is a plan view of the power element taken along line IV—IV of Fig. 2; and Fig. 5 is a fragmentary detail view, in section, of a check valve unit usable with the washer system of the instant invention.

The windshield washer system of the instant invention utilizes a power element comprising a bellows member having elastic sidewalls and arranged so that when once depressed the bellows will thereafter take in fluid from a reservoir to which it is connected upon resuming its normal form. In addition, the bellows member is provided with a relatively heavy outer top wall section designed to receive the thrust of a foot or other pressure-applying means applied thereto, and to act in the nature of a plunger in its downward movement to enter a pump chamber to effect liquid displacement therefrom and may, under other conditions, act to force the fluid in the bellows to distend the elastic sidewalls which then continue the hydrostatic pressure as they contract to their normal size, thus causing the bellows to empty itself of fluid gradually to maintain a substantially constant pressure in the delivery conduit and to provide a continuous jet of fluid against the windshield glass.

The windshield washer system of the instant invention is shown in Fig. 1 installed in place on a vehicle 1 provided with a windshield 2, and with a wiper assembly 3 mounted on a rockshaft 4 extending from a supporting housing 5. A fire wall 6 extends downwardly from the cowl of vehicle 1, and terminates in an inclined footrest floorboard portion 7.

The washer system itself is seen to comprise a reservoir 8 for a suitable fluid such as water, which reservoir is preferably detachably connected to fire wall 6 by any known means, not shown. A check valve unit 9, in the shape of a T, is secured to the top wall of reservoir 8 in a manner to be described more fully hereinafter, and a conduit 10 extends therefrom into reservoir 8 while a second and delivery conduit 11 extends from the other end of valve unit 9 through fire wall 6 and the cowl of vehicle 1 and through housing 5 to a jet type delivery nozzle 12 secured to housing 5, which nozzle may be of any known type. Nozzle 12 is arranged to jet fluid onto windshield 2 in the path of wiper 3. A third conduit 13 extends from valve unit 9 downwardly to a bellows member 14, which latter comprises the motor or pump mechanism of the washer system.

Referring now to Figs. 2 and 3, bellows 14 is seen to comprise a member of elastic material such as natural or synthetic rubber, which member includes a relatively heavy head or top wall section 15 and bottom wall section 16, and a relatively thin side wall portion 17 which is laterally distensible under fluid pressure developed by inward movement of top wall 15. The top wall section is self-sustaining in character to serve as a plunger for displacing liquid from the base section 16, which latter is cupped to provide a chamber large enough to receive the plunger. This cup-shaped chamber is reinforced by stiffening its peripheral wall to make it self-sustaining and its brim is joined to the lower portion of the plunger 15 by the readily foldable medial wall section 17 in order to have the latter follow the plunger into the chamber to enlarge its effective displacement area. The reinforcement of the cupped base section confines the expansion or distention of the side wall area of the bellows primarily to the thin medial wall 17 and also preforms and stabilizes the chamber formation 16 for conformably receiving and guiding the plunger 15 in its descent. Bottom wall 16 is appropriately recessed to provide a shoulder 18, and said bottom wall and shoulder interlock with a correspondingly configurated mounting anchor member 19 which extends through portion 7 of fire wall 6 and is secured thereto as by means of a washer 20 and nut 21. A fluid passage 22 of restricted diameter extends through member 19, and conduit 13 fits over the inner end of member 19 in communication with passage 22.

The check valve unit 9 may comprise any conventional construction and, as illustrated in Fig. 5, may for example comprise a body member 23 having fluid passages therethrough in the form of a T connection and including two valve chambers 24 and 25 each provided at their upper end with a fitting 26 and 27 permitting passage of fluid therethrough regardless of the position of the ball valves 28 and 29. The opposite end of each of chambers 24 and 25 is shaped to provide valve seats 30 and 31, valve seat 31 being formed on an internal fitting 32 threaded into the lower end of member 23. A fitting 33 is threaded into the upper end of member 23 to hold fitting 26 in place therein, an appropriate sealing gasket 34 being provided, and conduit 11 extends into fitting 33. At its lower end, member 23 is secured to reservoir 8 by means of a nut 35 which may be welded to the top wall of said reservoir.

Thus, it will be seen that valve 9 permits fluid to pass only outwardly of reservoir 8, and only outwardly of the valve unit to delivery nozzle 12. Of course, as previously set forth, any conventional check valve construction operable as aforesaid could be utilized.

The operation of this invention is as follows: It will be noted that bellows member 14 is placed on the lower inclined portion 7 of fire wall 6 so as to be in a position readily accessible to the foot of the vehicle operator. This arrangement is preferred since it enables the vehicle operator to actuate bellows 14 without diverting his eyes from the road ahead, but other positions including those designed for other means of applying pressure could be utilized if desired. After the bellows 14 has once been depressed, it will upon resuming its normal form take in fluid from reservoir 8 through valve unit 9 past valve 29 and through conduit 13 to the interior of bellows 14. In operation, the top wall section 15 receives the thrust of the operator's foot and is moved inwardly thereby, acting somewhat as a plunger tending to force the fluid within bellows 14 outwardly through passage 22 and conduit 13, past valve 28 and through conduit 11 to nozzle 12. However, passage 22 is of relatively small capacity and being thus restricted limits the escape of the fluid, whereby the hydrostatic pressure built up within bellows 14 upon depressing top wall 15 causes side wall section 17 to distend, as illustrated by full lines in Fig. 3. Then, since side wall 17 is elastic in nature, the restoring force of said side wall maintains this hydrostatic pressure on the fluid and continues to force fluid through passage 22, as illustrated by the broken line showing in Fig. 3, thus providing a continuous delivery of fluid to nozzle 12 while top wall 15 is held in its depressed position by the foot of the operator. In other words, the vehicle operator need depress top wall section 15 only once and then hold it in its depressed position and the reaction of side wall 17 to distension by the hydrostatic pressure causes a continuous stream of fluid to be jetted onto windshield 2. To prevent top wall 15 from closing off passage 22, bosses 36 are formed on the inner surface of top wall 15 and bear against mounting member 19 to provide a fluid passage therebetween, as clearly illustrated in Fig. 3.

Once the supply of fluid in bellows 14 has become exhausted, or sooner should the operator desire a shorter duration of the spray onto windshield 2, the pressure on top wall 15 of bellows 14 is released causing said bellows to resume its normal shape and with this action draw in another supply of fluid from reservoir 8 past check valve 29, valve 28 closing conduit 11 at this time. Thus, it will be seen that the bellows automatically restores its supply of fluid and is immediately ready for the next application of fluid to the windshield. By reason of the shape of bottom wall 16, and its relative size, a complete sealing action is provided between bellows 14 and mounting member 19, which sealing action is reinforced by the stretching or distension of side wall 17 of the bellows during the actuation thereof.

Thus, it will be seen that the instant invention fully accomplishes its foregoing objects, and provides a simple but efficient and effective windshield washing system operable with substantially no distraction to the vehicle operator. The bellows need merely be quickly depressed to distend the thin wall section 17 under the hydrostatic pressure where it is held as a continuous stream of fluid is jetted onto the windshield during the restorative action of wall 17 which continues for a duration sufficient under most circumstances to provide an adequate clearing action. The duration of the fluid delivery can be determined by the size of passage 22 and also the opening of nozzle 12, and should it be desirable to deliver more fluid than the capacity of the bellows on a single filling the pressure on the bellows need only be released momentarily and then reapplied to continue the delivery of fluid without any substantial interruption. The plunger-forming top wall 15, which may be provided with a suitable tread or wear surface, is depressible under a lighter foot pressure to eject the liquid from the pump chamber 16 without necessarily distending the foldable thin wall. However, any distention in the wall area of the bulb or bellows is confined primarily to medial wall 17 and in a plane above the cupped pump chamber. Consequently, the capacity of the pump chamber 16 itself is practically constant and its shape is substantially fixed for guidingly receiving the fluid displacing plunger. As the plunger enters the chamber and continues its descent therein it will carry the adjacent portion of the medial wall 17 thereinto to reduce its clearance and thereby augment its fluid displacement.

In other words, the bulb provides, in effect, a one-piece molded elastic pump unit having a chamber 16 and a plunger 15, the plunger being supported normally in an elevated position by the resilient medial wall. The side wall area of the bulb has substantially its lower half reinforced to provide the upstanding and self-sustaining chamber wall, and its upper half flexible and distensible to inroll into the underlying chamber as the plunger enters. Upon movement of the plunger into the chamber the ejection of the liquid content will follow because of the displacing action of the plunger entering the preformed chamber, and this action may be supplemented by the restorative action of the medial wall 17 when it has previously been distended under a predetermined hydrostatic pressure. Due to the inherent elasticity of the material from which the pump unit 14 is molded there is a possibility that the reinforced chamber wall may yield slightly under a very high pressure, but primarily the pressure responsing distention is confined to the medial wall 17.

While this invention has been disclosed in detail in a preferred embodiment thereof, it is not necessarily limited to such details and various changes therein may well occur to those skilled in the art without affecting the inventive concept. Accordingly, it is intended that the scope of this invention be determined solely by the appended claims.

Having fully disclosed this invention in a preferred embodiment thereof, and having completely described its operation, what is claimed as new is as follows.

1. A windshield washer pump unit comprising a one-piece construction in the form of a bulb molded of elastic material and having a bottom wall with an upstanding substantially cylindrical wall forming a chamber, a substantially cylindrical plunger-forming top wall of lesser diameter than the chamber for fluid-displacement reception thereby, and a medial pressure-distensible flexible wall joining the top rim of the chamber to the plunger and yieldably supporting the latter for being depressed into the chamber for displacing fluid therefrom, and inflow and outflow passage means communicating with the chamber, said chamber having its upstanding side wall reinforced to confine the pressure-responsive distention of the wall area of the bulb to said pressure-distensible medial wall section.

2. A windshield washer pump unit comprising a one-piece construction in the form of a bulb molded of elastic material and having a bottom wall with a marginal wall upstanding thereabout to form a chamber of cup shape, a self-sustaining plunger-forming top wall opposing the bottom wall and being less in diameter than the chamber for fluid-displacement reception therein, and a medial flexible wall joining the brim of the cupped chamber to the lower end portion of the plunger and yieldably supporting the latter normally elevated above the brim, said plunger and the adjoining portion of the medial wall being jointly depressible into the chamber to augment the effective displacement area of the unit, and inflow and outflow passage means communicating with the chamber, said upstanding wall being reinforced up to said brim to resist its lateral distention.

3. A windshield washer pump unit comprising an elastic one-piece bulb having a cupped base section providing a chamber, a top section providing a plunger of lesser diameter and depressible into the cupped base section, and a medial wall section joining the top section to the brim of the cupped base section and flexible for following the plunger into the cupped base section upon such depression of the top section, and inflow and outflow passage means communicating with the chamber, said cupped base section having its side wall reinforced up to the brim to confine the outward flexing of the bulb substantially to the medial wall section thereabove, said plunger having on its upper side a wear surface and being of such thickness that said wear surface remains exposed above the brim and the inwardly flexed medial wall section when the top section is so depressed.

4. A windshield washer pump unit comprising an elastic bulb having a cupped base section forming a chamber, a top section of lesser diameter than the chamber for being received therein, and a medial wall section joining the top section to the upper portion of the cupped base section and flexible upon the depression of the top section into the chamber, said cupped base section having its side wall reinforced up to the medial wall section, and a headed mounting member having an anchoring shank extending through a hole in the bottom wall of the cupped base section with the head of the mounting member arranged within the chamber and overlying the bottom wall to clamp it to a support, said mounting member including a cooperating clamp device engaged with the shank, and inflow and outflow passage means communicating with the chamber.

5. A windshield washer pump unit comprising a bellows having a bottom wall with a side wall upstanding from the outer marginal edge portion thereof and forming a cup-shaped chamber, a top wall constituting a plunger opposite the bottom wall, said plunger being of less diameter than said chamber for fluid displacement reception therein, a medial upwardly converging wall portion joining said side wall and the lower end of said plunger, said medial wall portion at its junction with the side wall being of a thickness less than the thickness of said side wall and defining an annular shoulder, said medial wall portion adjacent the shoulder being of greater flexibility than said side wall, said plunger being yieldably supported by such medial wall portion in a normally elevated position and receiving lateral support from the upstanding side wall when depressed into said chamber, said plunger acting to pull the medial wall portion towards said bottom wall to augment the effective displacement of the unit, and inflow and outflow passage means communicating with said chamber.

References Cited in the file of this patent
UNITED STATES PATENTS

| 2,012,218 | Burress | Aug. 20, 1935 |
| 2,105,676 | Stow | Jan. 18, 1938 |
| 2,126,624 | Eaddy | Aug. 9, 1938 |
| 2,368,091 | Andersen | Jan. 30, 1945 |
| 2,476,545 | Hayward | July 19, 1949 |
| 2,613,610 | Saalfrank | Oct. 14, 1952 |
| 2,681,249 | Zabilka | June 15, 1954 |